United States Patent [19]

Yamaguchi et al.

[11] Patent Number: 4,960,195
[45] Date of Patent: Oct. 2, 1990

[54] COMPONENT-ORIENTING APPARATUS

[75] Inventors: Masami Yamaguchi; Masatoshi Arishiro, both of Kyoto, Japan

[73] Assignee: Murata Manufacturing Co., Ltd., Japan

[21] Appl. No.: 278,226

[22] Filed: Nov. 30, 1988

[30] Foreign Application Priority Data

Nov. 30, 1987 [JP] Japan .................. 62-304015

[51] Int. Cl.⁵ .......................... B65G 47/24
[52] U.S. Cl. ........................ 193/44; 198/390; 209/682
[58] Field of Search ............ 193/44, 45, 46; 198/380, 381, 383, 389, 390, 391, 396; 221/167, 163, 169; 209/397, 680, 682

[56] References Cited

U.S. PATENT DOCUMENTS

| | | |
|---|---|---|
| 2,500,698 | 3/1950 | Mills .................... 198/390 X |
| 2,615,567 | 10/1952 | Campbell . |
| 2,786,566 | 3/1957 | Taggart et al. . |
| 4,395,184 | 7/1983 | Braden . |

FOREIGN PATENT DOCUMENTS

| | | |
|---|---|---|
| 1025239 | 8/1958 | Fed. Rep. of Germany . |
| 1135353 | 8/1962 | Fed. Rep. of Germany . |
| 2003594 | 8/1970 | Fed. Rep. of Germany . |
| 62-36630 | 8/1987 | Japan . |
| 0252819 | 10/1988 | Japan .................. 198/381 |
| 525201 | 8/1940 | United Kingdom . |
| 1155320 | 6/1969 | United Kingdom . |
| 2177074A | 1/1987 | United Kingdom . |

Primary Examiner—Joseph E. Valenza
Assistant Examiner—D. Glenn Dayoan
Attorney, Agent, or Firm—Ostrolenk, Faber, Gerb & Soffen

[57] ABSTRACT

A component-orienting apparatus provided with a plurality of parallel orienting passages for aligning a plurality of components such as rectangular-parallelopipedic electronic component chips in the same orientation as each other. Each of the orienting passages comprises a receiving portion provided with a first space defined by an upwardly-taperingly-opening first inner peripheral surface and an aligning passage having a cylindrical second inner peripheral surface defining a second space that communicates with the lower end of the first space. The aligning passage is selected to have sectional geometry which rejects the longitudinal dimension of each component but crosswisely and perpendicularly orients the component in prescribed directions respectively. The first inner peripheral surface is continuous with the second inner peripheral surface through a rounded face.

5 Claims, 4 Drawing Sheets

COMPONENT-ORIENTING APPARATUS

BACKGROUND OF THE INVENTION

1. Field of the Invention

The present invention relates to a component-orienting apparatus for aligning a plurality of rectangular-parallelopipedic components in the same orientation as with each other.

More specifically, the present invention can be applied to alignment of a plurality of rectangular-parallelopipedic electronic component chips in the same orientation as each other. Such alignment of the electronic component chips efficiently facilitates various operations that are performed on the electronic component chips in later steps.

2. Description of the Background Art

FIG. 8 is a perspective view showing two electronic component chips 1, to which the present invention can be applied. Each of the electronic component chips 1 may be a capacitor chip or an inductor chip, for example. Such a chip 1 has dimensions L, W and T along longitudinal, crosswise and perpendicular directions which are orthogonal to each other. Within the dimensions L, W and T, the longitudinal dimension L has the longest size. The crosswise dimension W, which is smaller than the longitudinal dimension L, may be larger than or equal to the perpendicular dimension T. The chip 1 is provided with external terminal electrodes 2 and 3 on its longitudinal ends. However, the present invention is also applicable to an electronic component chip being in the state of the so-called partially-fabricated item, which is not yet provided with such external terminal electrodes, for example.

The present invention is directed to a component-orienting apparatus for aligning components such as the rectangular-parallelopipedic electronic component chips 1 shown in FIG. 8, each of which has a longitudinal dimension L longer than other dimensions W and T, in the same orientation as each other. The components to be aligned are so oriented that the same are longitudinally parallel with each other while crosswisely and perpendicularly defined surfaces thereof are along constant directions. FIG. 8 shows an adjacent pair of electronic component chips 1, within a large number of those aligned in such a state. Although longitudinally and crosswisely defined surfaces of the adjacent pair of electronic component chips 1 are opposite to each other in FIG. 8, the electronic component chips 1 may be so aligned that longitudinally and perpendicularly defined surfaces thereof are opposite to each other.

The aligned state of the electronic component chips 1 shown in FIG. 8 is required for carrying out steps shown in FIGS. 9 to 11, for example.

FIG. 9 shows a prior art component-orienting apparatus 4 which is employed in the plant of the assignee. The component-orienting apparatus 4 is in the form of a plate as a whole, for example, and arranged to be horizontally dispersed as a plane. The component orienting apparatus 4 is provided with a plurality of orienting passages 5. The sectional geometry of each orienting passage 5 is determined in consideration of the outer geometry of each electronic component chip 1, in order to receive the chip 1 along a predetermined direction and to orient the same in a predetermined direction. An electronic component chip holder 6, which is in the form of a plate as a whole, for example, is provided under the component-orienting apparatus 4. This holder 6 is not known in the art, but merely employed in the plant of the assignee. The electronic component chip holder 6 has a plurality of receiving portions 7, which are defined by through holes, for example. Positions of the respective receiving portions 7 correspond to those of the respective orienting passages 5. Elastic members 8 of silicone rubber, for example, are formed on inner peripheral surfaces of the receiving portions 7. The elastic members 8 are adapted to elastically hold the electronic component chips 1, as understood from the following description. The electronic component chip holder 6 is thus adapted to receive and hold the electronic component chips 1 one by one in the respective receiving portions 7, to enable simultaneous handling of a large number of electronic component chips 1, which may be too small for direct handling. In more concrete terms, the electronic component chips 1 are handled for (i) measuring various electrical properties in steps of testing the same, (ii) forming the external terminal electrodes 2 and 3, (iii) performing soldering on the external terminal electrodes 2 and 3, (iv) taping or magazinizing the electronic component chips 1, (v) mounting the electronic component chips 1, and the like.

Referring again to FIG. 9, a plurality of chips 1 are first placed at random on the component-orienting apparatus 4, to be inserted in the receiving portions 7 of the holder 6 respectively in the aforementioned manner. At this time, a frame member 9 may be employed to prevent dropping of the chips 1 from the component-orienting apparatus 4. Then, horizontal vibration, for example, is applied to the component-orienting apparatus 4, while supplying vacuum suction into the orienting passages 5 through the receiving portions 7 as shown by arrows 10.

Among the chips 1, only those oriented in a predetermined direction are received in the orienting passages 5 in response to the above operation, as shown in FIG. 10. After the chips 1 are filled in all of the orienting passages 5, those remaining atop the component orienting apparatus 4 are removed.

Thereafter, as shown in FIG. 11, a pusher 12 having projections 11 in positions corresponding to the orienting passages 5 is moved in the direction of an arrow 13 to this, the projections 11 press the respective chips 1, which in turn are pushed into corresponding ones of the receiving portions 7 of the holder 6. At this time, the elastic members 8 are elastically deformed for receiving the chips 1, to finally elastically hold the chips 1.

It is understood that the configuration of the orienting passages 5 in the aforementioned component orienting apparatus 4 is significant for efficiently aligning the electronic component chips 1. Thus, the configuration of such orienting passages 5 has been devised in various ways. Japanese Patent Publication Gazette No. 36630/1987 discloses an exemplary configuration of such orienting passages.

FIGS. 12 to 14 illustrate an orienting passage 5a, the configuration of which is substantially similar to that disclosed in the aforementioned prior art. This orienting passage 5a basically comprises a receiving portion 14 and an aligning portion 15. The receiving portion 14 is provided with an upwardly-opening first space 17, which is defined by an inverse-conical inner peripheral surface 16. The aligning portion 15 has a cylindrical inner peripheral surface 19, which is rectangular in section, defining a second space 18 communicating with the lower end of the first space 17. The sectional geometry of the inner peripheral surface 19 is selected to reject a longitudinal dimension L of an electronic component chip 1 but crosswisely and perpendicularly orient the same in constant directions.

According to this prior art, the receiving portion 14 has the inverse-conical inner peripheral surface 16, to be capable of receiving the electronic component chip 1 regardless of the direction thereof. Thus, the electronic component chip 1 can be easily received in the first space 17 of the receiving portion 14.

However, the prior art shown in FIGS. 12 to 14 has the following problems to be solved:

First, it is rather difficult to introduce the electronic component chip 1, which is easily received in the receiving portion 14, sequentially into the aligning portion 15. One of the reasons for this may be that relatively sharp edges 20 and 21 are defined between the inner peripheral surface 16, which is circular in section, and the inner peripheral surface 19, which is rectangular in section. Thus, an electronic component chip 1, which is in a position shown by broken lines in FIG. 14, is undesirably engaged with the edge 20, for example, and prevented from insertion into the space 18 of the aligning portion 15.

In order to reduce the possibility of the aforementioned engagement between the chip 1 and the edge 20 or 21, the sectional dimensions of the inner peripheral surface 19 of the aligning portion 15 may be increased. In this case, however, the chip 1 cannot be accurately centered in the aligning portion 15.

Further, working steps for forming the inverse-conical inner peripheral surface 16 and the sectionally rectangular inner peripheral surface 19 are complicated. In general, the inverse-conical inner peripheral surface 16 is formed by drilling, while the inner peripheral surface 19, which is rectangular in section, is formed by broaching or electric-spark machining. In order to obtain the orienting passage 5a in a desired configuration, therefore, it is necessary to combine two types of working methods. Since such two types of working methods must be carried out in two steps, flashes are easily caused on the edges 20 and 21, which define the boundary between the receiving portion 14 and the aligning portion 15. Such flashes further hinder introduction of the chip 1 into the aligning portion 15, while after treatment for removing the flashes is extremely troublesome.

SUMMARY OF THE INVENTION

Accordingly, the present invention is directed to a component-orienting apparatus, which can solve the problems of the prior art shown in FIGS. 12 to 14, in particular.

The present invention provides a component-orienting apparatus provided with a plurality of orienting passages for aligning a plurality of components, each of which is in the form of a rectangular parallelopiped having longitudinal, crosswise and perpendicular dimensions being orthogonal to each other, wherein the longitudinal dimension has the longest size, in the same orientation with each other. In order to solve the aforementioned technical problems, the inventive component-orienting apparatus has the following structure:

Each of the orienting passages comprises a receiving portion provided with a first space which is defined by an upwardly-taperingly-opening first inner peripheral surface, and an aligning portion having a cylindrical second inner peripheral surface defining a second space that communicates with the lower end of the first space provided in the receiving portion. The sectional geometry of the second inner peripheral surface is so selected as to reject the longitudinal dimension of the component but to crosswisely and perpendicularly orient the same in constant directions respectively.

The first inner peripheral surface is continuous with the second inner peripheral surface through a rounded face.

In the inventive component-orienting apparatus, each of rectangular-parallelopipedic components is first received in the upwardly-taperingly-opening first space provided in each receiving portion. Then, the component is guided by the rounded face provided between the first inner peripheral surface defining the first space and the second inner peripheral surface of the aligning portion defining the second space, to enter the second space. The sectional geometry of the second inner peripheral surface defining the second space is so selected as to reject the longitudinal dimension of the component but to crosswisely and perpendicularly orient the same in constant directions respectively, as hereinabove described. Thus, a plurality of components positioned in respective aligning portions of a plurality of such orienting passages can be aligned in the same condition with each other along predetermined directions.

Thus, according to the present invention, the components received in the receiving portions are smoothly introduced into the aligning portions through the rounded faces. Since the receiving portions are provided with the upwardly-taperingly-opening first spaces, the components can be easily received in the receiving portions, as a matter of course. Thus, a large number of components can be efficiently aligned in the orienting passages in prescribed condition.

The components can be easily introduced into the aligning portions through the aforementioned rounded faces. Therefore, it is not necessary to provide large clearances between the second inner peripheral surfaces of the aligning portions and the outer surfaces of the components. Thus, the aligned components can be accurately centered in the aligning portions.

According to the present invention, it may be unnecessary to provide two types of inverse-conical and sectionally rectangular inner peripheral surfaces, dissimilarly to the prior art shown in FIGS. 12 to 14. Orienting passages may be easily formed by a single working step such as drilling, to cause no problem of flashes.

These and other objects, features, aspects and advantages of the present invention will become more apparent from the following detailed description of the present invention, when taken in conjunction with the accompanying drawings.

DESCRIPTION OF THE PREFERRED EMBODIMENTS

Figure 1:
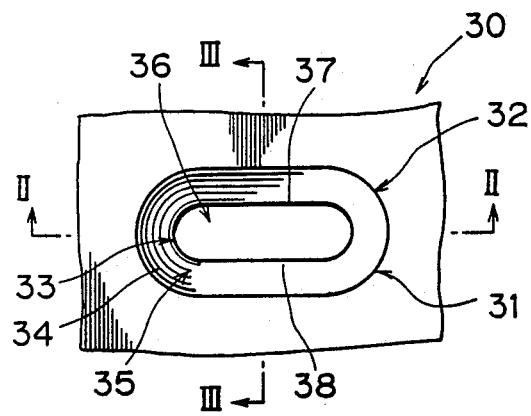
FIG. 1 is a fragmentary enlarged plan view showing a component-orienting apparatus 30 according to an embodiment of the present invention.
Figure 3:
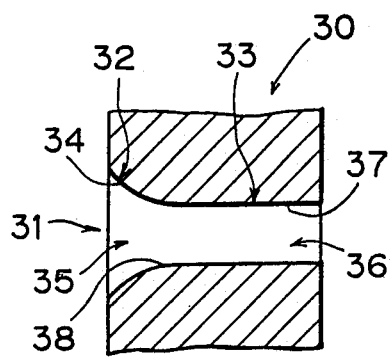
FIG. 3 is a sectional view taken along the line III—III in FIG. 1.
Figure 2:
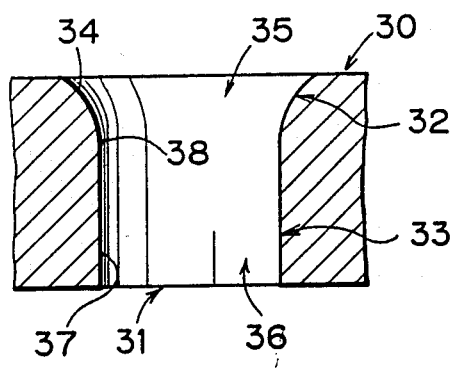
FIG. 2 is a sectional view taken along the line II—II in FIG. 1.

FIGS. 1 to 3 show a principal part of a component-orienting apparatus 30 according to an embodiment of the present invention. This component-orienting apparatus 30 is in the form of a plate as a whole, substantially similar in this regard to that shown in FIGS. 9 to 11. FIGS. 1 to 3 show a single orienting passage 31, which is one of a plurality of those parallelly provided in such a component-orienting apparatus 30.

Figure 12:
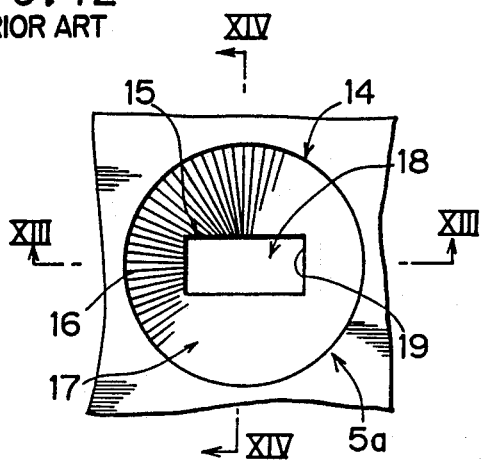
FIG. 12 is a fragmentary enlarged plan view showing a component-orienting apparatus which forms the prior art of interest to the present invention.
Figure 14:
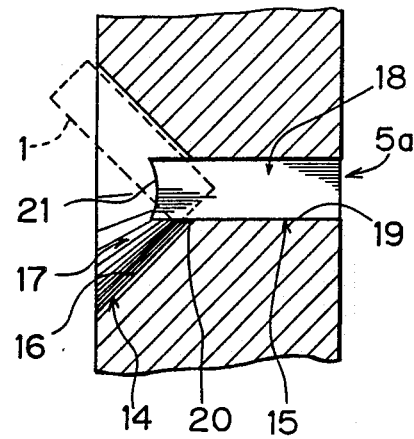
FIG. 14 is a sectional view taken along the line XIV—XIV in FIG. 12.
Figure 13:
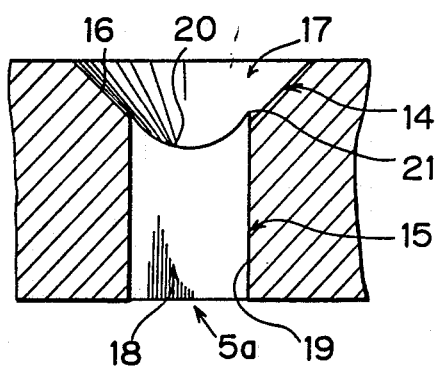
FIG. 13 is a sectional view taken along the line XIII—XIII in FIG. 12.

The orienting passage 31 basically comprises a receiving portion 32 and an aligning portion 33, similarly to the orienting passage 5a shown in FIGS. 12 to 14. Thus, the receiving portion 32 receives a component (not shown) such as an electronic component chip, for example, which is to be aligned in the aligning portion 33 with those adjacent thereto along a predetermined direction.

The receiving portion 32 is provided with a first space 35 which is defined by an upwardly-taperingly opening first inner peripheral surface 34.

Figure 8:
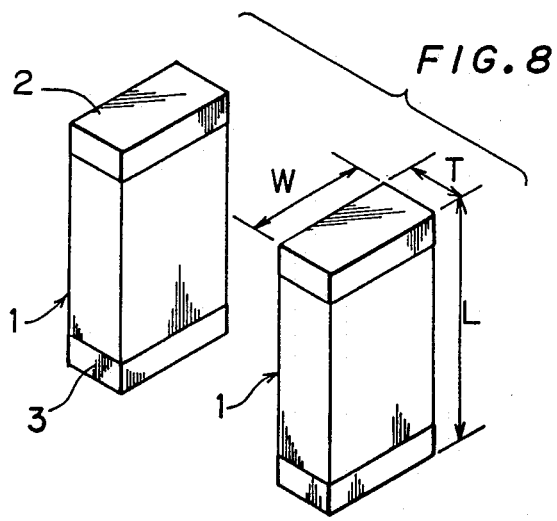
FIG. 8 is a perspective view showing an exemplary orientation of electronic component chips 1, which are in an aligned state attained by the present invention.

On the other hand, the aligning portion 33 has a cylindrical second inner peripheral surface 37 defining a second space 36 which communicates with the lower end of the first space 35 provided in the receiving portion 32. When the component-orienting apparatus 30 is applied to the rectangular-parallelopipedic electronic component chip 1 shown in FIG. 8, for example, the sectional geometry of the second inner peripheral surface 37 is so selected as to reject the longitudinal dimension L of the chip 1 but to crosswisely and perpendicularly orient the same along constant directions respectively.

As clearly shown in FIGS. 2 and 3, the first inner peripheral surface 34 is continuous with the second inner peripheral surface 37 through a rounded face 38. According to this embodiment, the first inner peripheral surface 34 is also rounded with curvature which is substantially similar to that of the rounded face 38. However, this is not an essential characteristic of the present invention.

Figure 9:
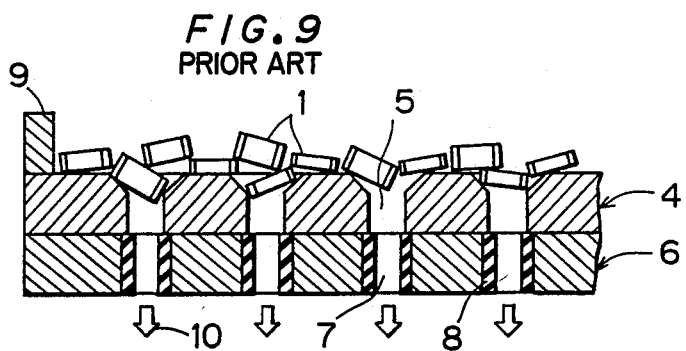
FIGS. 9 to 11 are sectional views showing exemplary application of a prior art component-orienting apparatus 4, and an electronic clip holder 6 for illustrating the background of the present invention.
Figure 10:
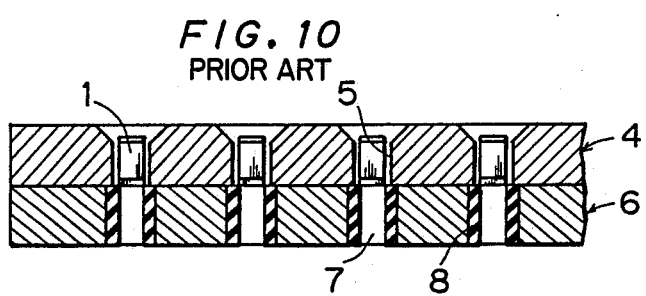
Figure 11:
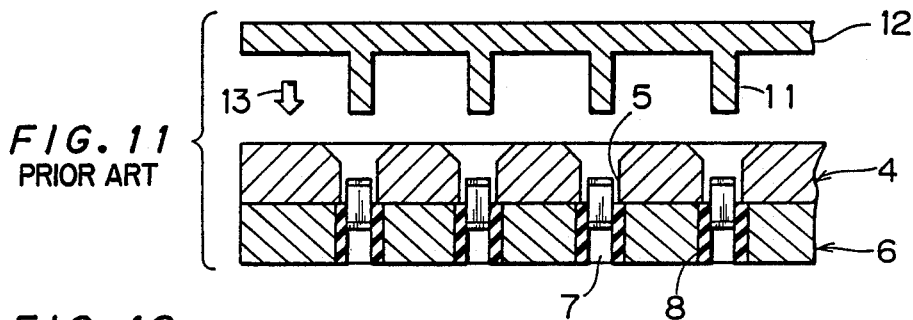

The component-orienting apparatus 30 is used in the mode shown in FIGS. 9 to 11, for example. According to the component-orienting apparatus 30, the opening of the first space 35 is defined by an elongated hole as shown in FIG. 1, whereby the chip 1 is received in the first space 35 in a somewhat oriented state in a stage corresponding to that shown in FIG. 9. The chip 1 once received in the first space 35 is immediately introduced into the second space 36 through the rounded face 38. According to this embodiment, the chip 1 can thus be smoothly introduced into the second space 36 of the aligning portion 33, whereby a clearance to be defined between the chip 1 and the second space 36 can be minimized. For example, a clearance of not more than 0.05 mm is sufficient for a chip 1 having a perpendicular dimension T of 0.55 mm. Thus, accuracy for centering the chip 1 positioned in the aligning portion 33 can be improved.

Figure 4:
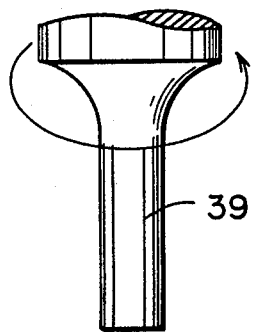
FIG. 4 is a front elevational view showing a drill 39 employed for forming an orienting passage 31 shown in FIGS. 1 to 3.

The orienting passage 31 shown in FIGS. 1 to 3 can be easily worked by a drill 39 shown in FIG. 4, for example. Namely, the drill 39 is adapted to form a hole in a prescribed position of a metal plate of stainless steel, for example, for providing the component-orienting apparatus 30. Thereafter, either the drill 39 or the metal plate is transversely moved, thereby to finish the first and second inner peripheral surface 34 and 37 as well as the rounded face 38. The first and second inner peripheral surface 34 and 37 and the rounded face 38 can be finished in good states through such a simple drilling step so as to cause no problem of flashes.

Figure 5:
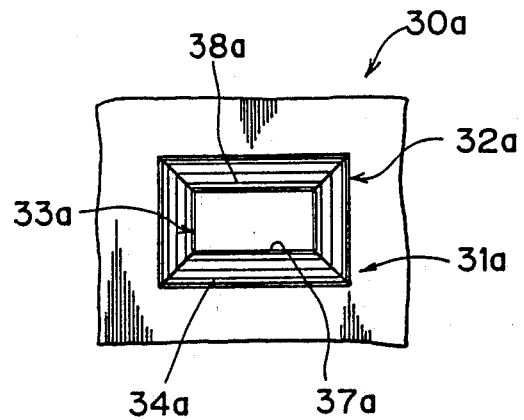
FIG. 5 is a fragmentary enlarged plan view corresponding to FIG. 1, for illustrating another embodiment of the present invention.

FIG. 5 is a fragmentary enlarged plan view corresponding to FIG. 1, for illustrating another embodiment of the present invention. In an orienting passage 31a of a component-orienting apparatus 30a shown in FIG. 5, both a first inner peripheral surface 34a of a receiving portion 32a and a second inner peripheral surface 37a of an aligning portion 33a are rectangular in section, and hence rounded faces 38a are formed along respective sides of such rectangles. Thus, this embodiment is merely different in plane configuration from that shown in FIGS. 1 to 3, but the sectional configuration of the orienting passage 31a shown in FIG. 5 is substantially similar to that shown in FIGS. 2 and 3.

Figure 6:
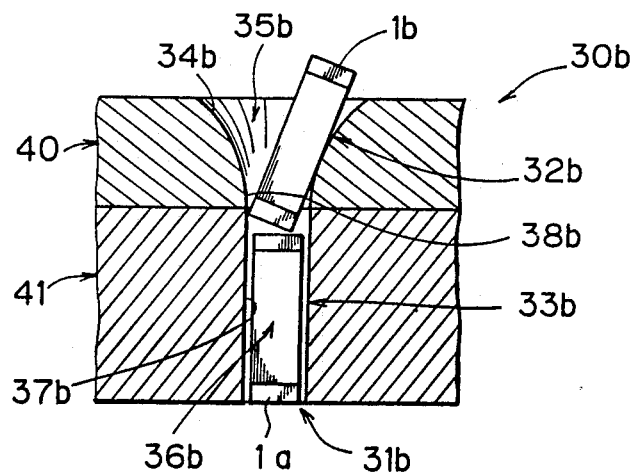
FIG. 6 is a sectional view corresponding to FIG. 3, for illustrating still another embodiment of the present invention.
Figure 7:
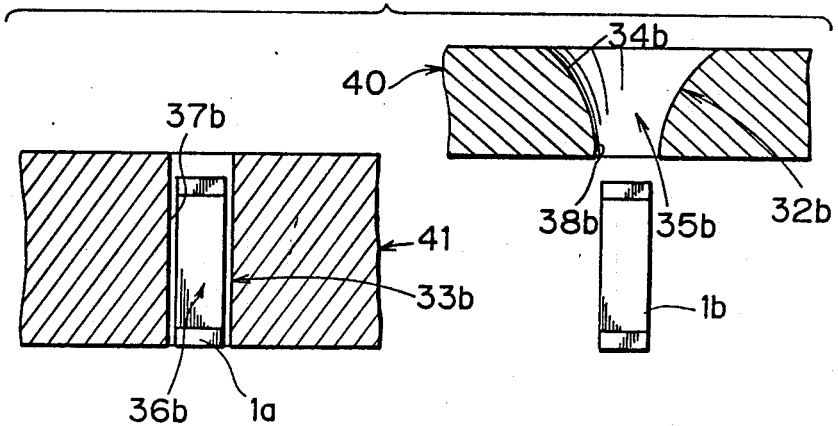
FIG. 7 is a sectional view showing a receiving-side member 40 and an aligning-side member 41, forming a component-orienting apparatus 30b shown in FIG. 6, shown separated from each other.

FIGS. 6 and 7 illustrate still another embodiment of the present invention. FIG. 6 corresponds to FIG. 3. It may be necessary to increase the vertical dimension of each orienting passage, depending on the configuration and dimensions of components such as electronic component chips to which the inventive component orienting apparatus is applied. The embodiment shown in FIGS. 6 and 7 is particularly advantageous in such case.

Referring to FIG. 6, a component-orienting apparatus 30b has orienting passages 31b, each of which has a relatively long vertical dimension. This component-orienting apparatus 30b is formed by a receiving-side member 40 and an aligning-side member 41, which are vertically stacked together. The receiving-side member 40 can be separated from the aligning-side member 41. A receiving portion 32b and an aligning portion 33b forming each orienting passage 31b are provided in the receiving-side member 40 and the aligning-side member 41 respectively. Also in this embodiment, the receiving portion 32b is provided with a first space 35b which is defined by an upwardly-taperingly-opening first inner peripheral surface 34b. Further, the aligning portion 33b has a cylindrical second inner peripheral surface 37b defining a second space 36b, which communicates with the lower end of the first space 35b. The sectional geometry of the second inner peripheral surface 37b is selected in relation to the dimensions of an electronic component chip 1 to which the component-orienting apparatus 30b is applied, similarly to the second inner peripheral surface 37 shown in FIGS. 1 to 3. The first inner peripheral surface 34b is continuous with the second inner peripheral surface 37b through a rounded face 38b.

In the state shown in FIG. 6, an electronic component chip 1a is already received in the second space 36b of the aligning portion 33b. However, another electronic component chip 1b is also received in the first space 35b of the receiving portion 32b since the orienting passage 31b is deeper than those of the aforementioned embodiments. Although such an upwardly-positioned chip 1b must be removed for carrying out the step shown in FIG. 11, for example, it is rather difficult to discharge the chip 1b once deeply introduced into the receiving portion 32b. According to this embodiment, however, the receiving-side member 40 can be separated from the aligning-side member 41 as shown in FIG. 7, thereby to efficiently remove unwanted chips such as the chip 1b shown in FIG. 6. The step shown in FIG. 11, for example, may be carried out only through the aligning-side member 41 after the same is separated from the receiving-side member 40.

While the present invention has been described with reference to the embodiments shown in the drawings, various modifications are also possible within the scope of the present invention.

In the embodiment shown in FIG. 1, for example, the first inner peripheral surface 34 provided in the receiving portion 32 is similar in sectional configuration to the second inner peripheral surface 37 provided in the aligning portion 33. However, this is not an essential characteristic of the present invention, but sectional configurations of first and second inner peripheral surfaces can be separately selected so far as the object of the present invention is attained.

Orienting passages of the inventive component-orienting apparatus may be aligned in parallel with each other, or may be provided to form parallel rows and columns.

The present invention can be widely applied to orientation of various types of rectangular-parallelopipedic components, in addition to electronic component chips.

Although the present invention has been described and illustrated in detail, it is clearly understood that the same is by way of illustration and example only and is not to be taken by way of limitation; the scope of the present invention being limited only by the terms of the appended claims.

What is claimed is:

1. A component-orienting apparatus provided with a plurality of parallel orienting passages for aligning in the same orientation as each other a plurality of rectangular-parallelopidpedic components each having longitudinal, crosswise and perpendicular dimensions that are orthogonal to each other, wherein said longitudinal dimension has the longest size;

each of said orienting passages comprising:
a receiving portion provided with a first space defined by a first inner peripheral surface with an upwardly-taperingly opening; and
an aligning portion having a cylindrical second inner peripheral surface defining a second space communicating with the lower end of said first space provided in said receiving portion, sectional geometry of said second inner peripheral surface being so selected as to reject said longitudinal dimension of each said component but to crosswisely and perpendicularly orient said component in predetermined respective directions
said first and second spaces having elliptic sectional configurations;
said first inner peripheral surfaces being continuous with said second inner peripheral surface through a rounded face lacking a sharp edge, and further being similar in sectional configuration to said second inner peripheral surface.

2. A component-orienting apparatus in accordance with claim 1, wherein the sectional configuration of said first space is longitudinally oriented in the same direction as that of the sectional configuration of said second space.

3. A component-orienting apparatus in accordance with claim 2, wherein said first and second spaces have rectangular sectional configurations.

4. A component-orienting apparatus in accordance with claim 1, further comprising an aligning-side member and a receiving-side member stacked on said aligning-side member, which can be separated from each other, said receiving portions and said aligning portions being provided in said receiving-side member and said aligning-side member respectively.

5. A component-orienting apparatus in accordance with claim 1, wherein said components are electronic component chips.

* * * * *